UNITED STATES PATENT OFFICE.

SIEGMUND HANS ECKMANN, OF MANCHESTER, ENGLAND, ASSIGNOR TO WESTINGHOUSE ELECTRIC AND MANUFACTURING COMPANY, A CORPORATION OF PENNSYLVANIA.

ELECTRICAL SYSTEM.

1,349,371.  Specification of Letters Patent.  Patented Aug. 10, 1920.

Application filed July 14, 1915. Serial No. 39,918.

*To all whom it may concern:*

Be it known that I, SIEGMUND HANS ECKMANN, a subject of the Emperor of Germany, and a resident of Manchester, in the county of Lancaster, England, have invented a new and useful Improvement in Electrical Systems, of which the following is a specification.

My invention relates to systems in which electric motors are employed in connection with winding machinery, rolling mills and other machines in the operation of which large fluctuations in the load are experienced, and it has for its object to provide an improved system and arrangement of machines which will prevent an excessive amount of current being taken from the mains from which electrical energy is supplied.

In a system arranged according to the present invention, the variation in voltage of the power supplied to the electric motor, which is employed in operating a mine hoist, for example, is obtained in accordance with a well known arangement in which the field current of the generator supplying current to said electric motor is varied in order to vary the voltage generated, as desired. The generator has its rotary member mounted on the same shaft or otherwise mechanically connected to the rotary member of the main motor, thereby constituting a motor-generator set.

The distinguishing feature of the present invention consists in the provision of a direct-current machine that is furnished with a suitable fly-wheel and is connected in parallel with a direct-current generator mounted on the same shaft or mechanically connected to the shaft of the main generator. The current in the field winding of said machine is regulated by a variable resistor which is controlled in accordance with the current supplied to the motor of the motor-generator set.

Figure 1:
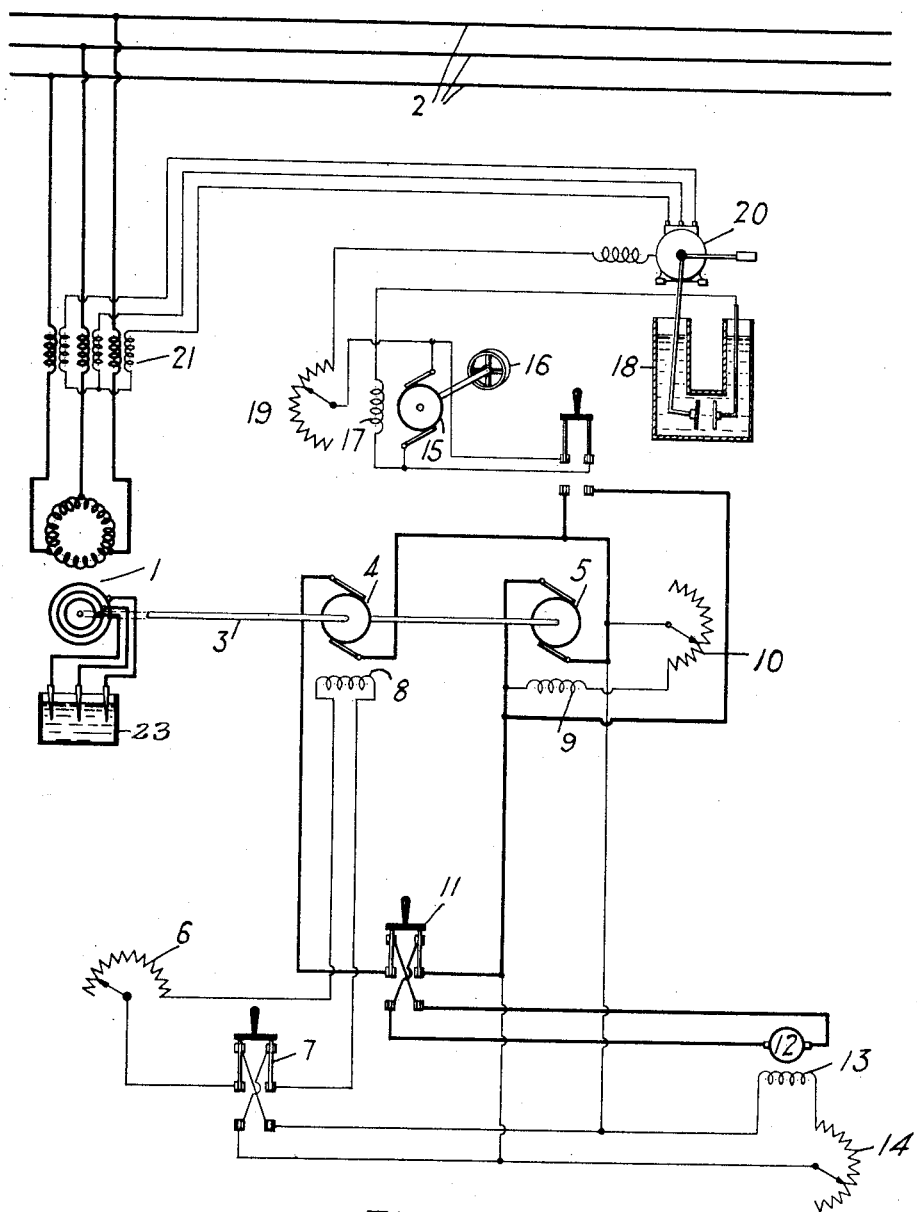
Figure 2:
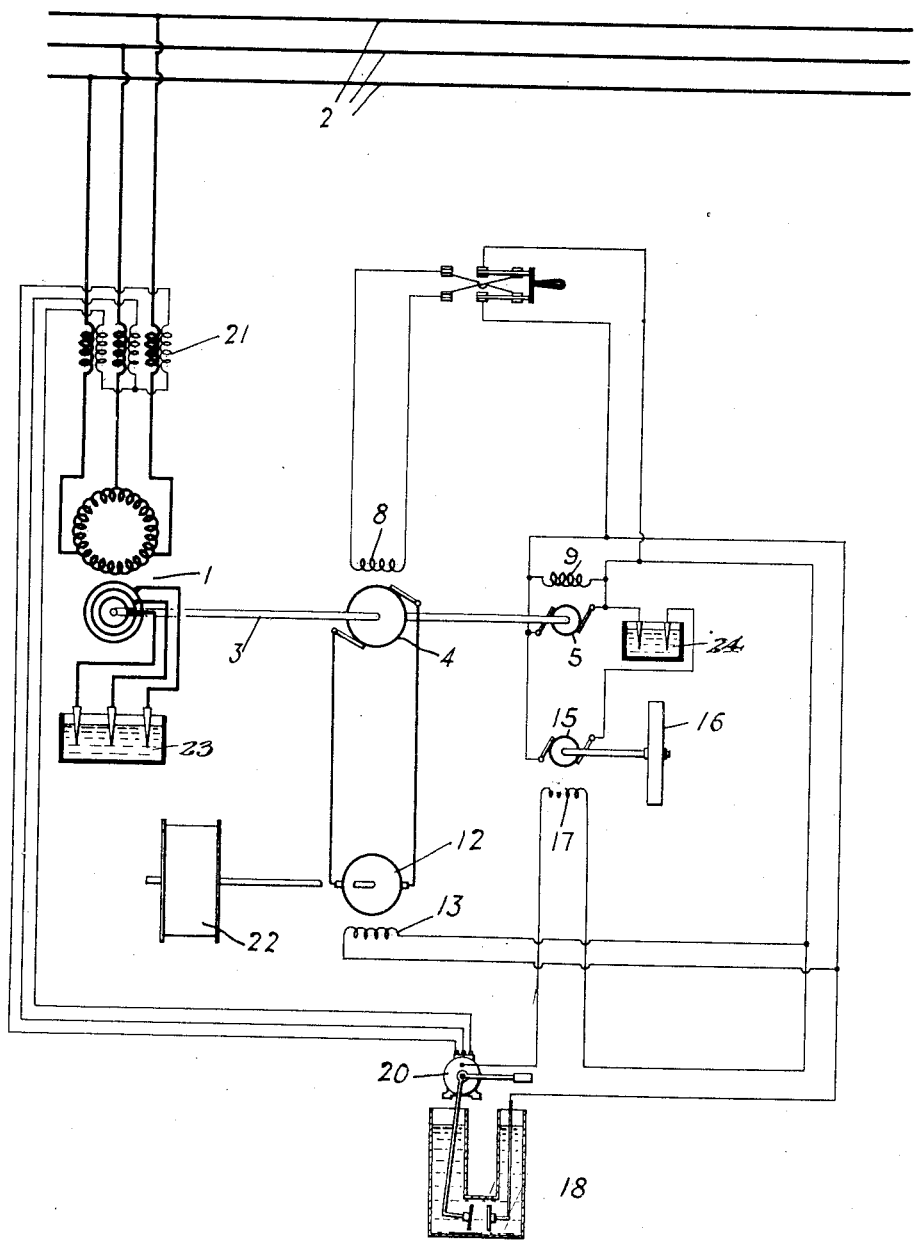

In order that the nature of the invention may be clearly understood, it will now be described with reference to the accompanying drawings, in which Figure 1 is a diagrammatic view of circuits and apparatus arranged in accordance therewith. Fig. 2 is a similar view of a modification. Similar reference numerals indicate the same parts in both diagrams.

In the arrangement shown in Fig. 1, the main motor is a three-phase alternating-current motor 1, supplied with current from three-phase mains 2. On the shaft 3 of said motor, are mounted the armatures of two direct-current generators 4, 5, respectively, of which, the one marked 4 is adapted to have its voltage varied by means of a rheostat 6 and reversing switch 7 which are in circuit with its separately excited field-magnet winding 8. The other generator 5 is adapted to generate a constant voltage, it being provided with a shunt field-magnet winding 9 having a rheostat 10 in series therewith. The two generators are connected in series and supply current through a reversing switch 11 to the winding motor 12.

The field-magnet winding of the winding motor, which is shown at 13, is connected in parallel with the field-magnet winding 8 of the generator 4, both windings being supplied from the terminals of the constant-voltage generator 5. A rheostat 14 is in circuit with the field winding 13. In parallel with the generator 5, is provided an equalizing direct-current machine, the armature of which is indicated at 15, furnished with a suitable fly-wheel 16. The field winding 17 of the equalizing machine is connected in circuit through a liquid rheostat 18 and an adjustable resistor 19. The liquid rheostat is automatically controlled by a regulator 20 that is operated in accordance with the current supplied from the main leads 2 to the main motor 1 by means of series transformers indicated at 21, in a well known manner.

The two generators 4, 5 are so wound as to give normally the same voltage, the voltage of each generator being equal to half the voltage required for normally operating the winding motor 12, so that, when said generators oppose each other, the voltage supplied to the winding motor will be zero and, when the generator voltages assist each other, the full voltage will be supplied at the terminals of the winding motor. For this purpose, the direction of the current from the generator 4 can be controlled by operating the reversing switch 7 which is provided in its field circuit.

As hereinabove mentioned, the current in the field winding 17 of the equalizing machine 15 is controlled in accordance with the current supplied to the main motor 1, this control being so arranged that, when the current is small, the field of the equalizing machine is weakened and the fly-wheel 16 therefore increases in speed so that energy will be absorbed by the motor 15 from the constant-potential generator 5. When the current supplied to the motor 1 is large, the equalizer field is strengthened, and the fly-wheel 16 is caused to slow down so that energy will be delivered therefrom to the constant voltage generator 5. It will be readily appreciated without further description that, at those times when the energy required by the winding motor 12 is below normal, the equalizing machine 15 will be speeded up, and energy will be absorbed by the fly-wheel 16, this energy being returned to the constant-potential generator 5 and thence to the winding motor 12 when the demand is greater than normal. The fluctuations in the current supplied to the main motor 1 will therefore be reduced.

In the arrangement shown in Fig. 2, the winding motor 12, which is operatively connected to a drum 22, is supplied with current from the generator 4 only, and the additional machine 5 is only mechanically connected to the generator 4, its electrical circuit having no connection therewith. The energy absorbed by the fly-wheel 16, when the equalizing machine 15 increases in speed, is transferred mechanically from the main motor 1 to the generator 5 and thence to the equalizing machine 15. When the fly-wheel decreases in speed, energy is returned mechanically from the generator 5 to the generator 4. The voltage of the generator 4 must, in this case, be variable from zero to the maximum value required by the winding motor 12, while the machine 5 need only be sufficiently large to transmit the necessary power to and from the equalizing machine 15.

Each of the arrangements shown and described above embodies a liquid rheostat 23 in circuit with the secondary windings of the motor 1 by means of which the system may be started or the speed of the shaft 3 and its connected parts may be regulated as desired. The resistance of the circuit comprising the armatures of the generator 5 and the equalizing machine 15 (Fig. 2) is controlled by a liquid rheostat 24.

I claim as my invention:

1. In a motor-control system, the combination with a source of current, an electric motor, and means comprising a pair of generators for translating energy from said source to said motor, of means for connecting said generators to assist or to oppose each other, and means comprising an electric motor electrically connected to said generators for supplying energy to, or absorbing energy from, said translating means in accordance with the value of the current supplied by said source.

2. In a motor-control system, the combination with a source of current, and an electric motor, of means comprising a plurality of generators arranged in series relation for translating energy from said source to said motor, and a dynamo-electric machine electrically connected to one of said generators for supplying energy to, or absorbing energy from, said translating means in accordance with the value of the current supplied by said source.

3. In a motor-control system, the combination with a source of current, and an electric motor, of means comprising a plurality of electric generators arranged in series relation for translating energy from said source to said motor, a dynamo-electric machine operatively connected to said translating means and electrically connected to one of said generators, an energy-storing device operatively connected to said dynamo-electric machine, and means for controlling the field excitation of said dynamo-electric machine in accordance with the current supplied by said source.

4. In a motor-control system, the combination with a source of current, and an electric motor, of means comprising two generators, one of which operates at constant voltage, for translating energy from said source to said motor, a dynamo-electric machine electrically connected to said constant-voltage generator, an energy-storing device operatively connected to said dynamo-electric machine, and means for controlling the speed of said dynamo-electric machine in accordance with the current supplied by said source.

5. In a motor-control system, the combination with a source of current, and an electric motor, of means comprising a pair of electric generators connected in series relation for translating energy from said source to said motor, and means comprising a dynamo-electric machine in circuit with one of said generators for supplying energy to, or absorbing energy from, said translating means in accordance with the value of the current supplied by said source.

6. In a motor-control system, the combination with a source of current, an electric motor, and a motor-generator for translating energy from said source to said motor, of a constant-voltage generator operatively connected to said motor-generator and electrically connected to said motor, a dynamo-electric machine electrically connected to said generator, and means for controlling the field excitation of said dynamo-electric machine in accordance with the value of the current supplied by said source whereby said dynamo-electric machine supplies energy to, or absorbs energy from, said constant-voltage generator.

7. In a motor-control system, the combination with a source of current, an electric motor, and a motor-generator for translating energy from said source to said motor, of a constant-voltage generator operatively connected to said motor-generator and electrically connected to said motor, a dynamo-electric machine electrically connected to said generator, a fly wheel operatively connected to said dynamo-electric machine, and means for controlling the field excitation of said dynamo-electric machine in accordance with the value of the current supplied by said source whereby said dynamo-electric machine supplies energy to, or absorbs energy from, said constant-voltage generator.

8. In a motor-control system, the combination with a source of energy, and an electric motor, of means for translating energy from said source to said motor, said means comprising an electric circuit including a plurality of generators, one only of which operates at substantially constant voltage, and means for supplying energy to, or absorbing energy from, said translating means in accordance with the value of the current supplied by said source.

9. In a motor-control system, the combination with a source of energy, a shaft operated by energy from said source, and an electric motor, of means comprising a pair of generators mounted upon said shaft for translating energy from said source to said motor, means for connecting said generators to assist or to oppose each other, and means comprising a dynamo-electric machine in circuit with at least one of said generators for supplying energy to, or absorbing energy from, said translating means in accordance with the value of the current supplied by said source.

10. In a motor-control system, the combination with a source of energy, an electric motor, and means comprising a pair of generators for translating energy from said source to said motor, of means for connecting said generators to assist or to oppose each other, and means electrically connected to one of said generators for supplying energy to, or absorbing energy from, said translating means in accordance with the value of the current supplied by said source.

11. In a motor-control system, the combination with a source of energy, and an electric motor having a shunt-field winding, of means comprising a plurality of generators in circuit with said motor for translating energy from said source to said motor, each having a shunt-field winding, one of said generators being of constant voltage, and the shunt-field windings of said motor and of another generator being in circuit with said constant-voltage generator, and means in circuit with said constant-voltage generator for supplying energy to, or absorbing energy from, said translating means in accordance with the value of the current supplied by said source.

12. In a motor-control system, the combination with a source of current, and a main motor connected thereto, of a pair of generators and a second motor in circuit with one another, and each having a shunt field winding, the armatures of said generators being mounted upon the armature shaft of said main motor, and the shunt field winding of one of said generators and of said second motor being in circuit with the armature of said second generator and in parallel relation to each other, a dynamo-electric machine having an armature in circuit with the armature of said second generator and a shunt field winding having a resistor, and means for controlling said resistor in accordance with the value of the current in said source.

In testimony whereof, I have hereunto subscribed my name this twenty-eighth day of June, 1915.

SIEGMUND HANS ECKMANN.

Witnesses:
FRANK L. HUTH,
ARTHUR HENRY HOFFA.